United States Patent
Davidson et al.

(10) Patent No.: US 8,695,330 B2
(45) Date of Patent: Apr. 15, 2014

(54) REDUCTANT DECOMPOSITION SYSTEM

(75) Inventors: Debbie Davidson, Darlington (GB); Duncan Engeham, Darlington (GB); Piotr Urban, Darlington (GB); David Elsey, Darlington (GB); Z. Gerald Liu, Madison, WI (US); Ken Pawson, Northampton (GB); Paul Smith, Darlington (GB); Ken Capel, Darlington (GB); Andrew Critchley, Darlington (GB); David Sarcona, Oregon, WI (US); James R Goss, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 610 days.

(21) Appl. No.: 12/910,700

(22) Filed: Oct. 22, 2010
(Under 37 CFR 1.47)

(65) Prior Publication Data

US 2011/0099978 A1    May 5, 2011

Related U.S. Application Data

(63) Continuation of application No. 12/753,632, filed on Apr. 2, 2010, now abandoned.

(60) Provisional application No. 61/166,159, filed on Apr. 2, 2009.

(51) Int. Cl.
*F01N 3/10* (2006.01)

(52) U.S. Cl.
USPC .................. 60/303; 60/286; 60/295; 60/324

(58) Field of Classification Search
USPC ........... 60/274, 286, 295, 297, 301, 303, 322, 60/324
See application file for complete search history.

(56) References Cited

U.S. PATENT DOCUMENTS 2,370,062 A    2/1945    Mercier
2,858,853 A    11/1958   Lyon
(Continued)

FOREIGN PATENT DOCUMENTS

CN    2443152 Y    8/2001
EP    1514591 A1   3/2005
(Continued)

OTHER PUBLICATIONS

CN200710106538.0 Office Action, Aug. 18, 2010.
(Continued)

*Primary Examiner* — Binh Q Tran
(74) *Attorney, Agent, or Firm* — Foley & Lardner LLP

(57) ABSTRACT

Described herein are various embodiments of a reductant decomposition system. According to one representative embodiment, the reductant decomposition system includes an exhaust gas chamber including an inlet and outlet. The system also includes a first exhaust gas distribution component positioned within the chamber and communicable in exhaust gas receiving communication with the outlet. The first exhaust gas distribution component causes swirling exhaust gas flow patterns within the exhaust gas chamber. Additionally, the system includes a second exhaust gas distribution component positioned within the chamber and communicable in exhaust gas providing communication with the inlet. The second exhaust gas distribution component includes features that cause a swirling exhaust gas flow pattern within a space defined by the second exhaust gas distribution component. Further, the system includes a reductant injector coupled to the exhaust gas chamber. The reductant injector is communicable in reductant injecting communication with exhaust gas within the chamber.

21 Claims, 10 Drawing Sheets

(56) References Cited

U.S. PATENT DOCUMENTS

| | | |
|---|---|---|
| 2,919,720 A | 1/1960 | Nicholls |
| 3,032,969 A | 5/1962 | Barnes |
| 3,520,131 A | 7/1970 | Briggs |
| 3,543,510 A | 12/1970 | Kaufmann |
| 3,605,389 A | 9/1971 | Buttler |
| 3,741,730 A | 6/1973 | Alcott |
| 4,066,214 A | 1/1978 | Johnson |
| 4,077,206 A | 3/1978 | Ayyagari |
| 4,209,493 A | 6/1980 | Olson |
| 4,245,980 A | 1/1981 | Reed et al. |
| 4,249,164 A | 2/1981 | Tivy |
| 4,685,534 A | 8/1987 | Burstein et al. |
| 4,719,751 A | 1/1988 | Kume et al. |
| 4,909,346 A | 3/1990 | Torkelson |
| 5,058,704 A | 10/1991 | Yu |
| 5,339,629 A | 8/1994 | Winberg et al. |
| 5,515,674 A | 5/1996 | Kaufmann, Jr. |
| 5,590,523 A | 1/1997 | Fox |
| 5,611,203 A | 3/1997 | Henderson et al. |
| 5,746,242 A | 5/1998 | Frederick |
| 5,755,092 A | 5/1998 | Dessale et al. |
| 5,832,732 A | 11/1998 | Knopfel et al. |
| 5,884,472 A | 3/1999 | Presz, Jr. et al. |
| 5,941,069 A * | 8/1999 | Heath ............... 60/307 |
| 6,021,639 A | 2/2000 | Abe et al. |
| 6,138,651 A | 10/2000 | Mori et al. |
| 6,203,770 B1 | 3/2001 | Peter-Hoblyn et al. |
| 6,233,920 B1 | 5/2001 | Presz, Jr. et al. |
| 6,272,851 B1 | 8/2001 | Mori et al. |
| 6,361,754 B1 | 3/2002 | Peter-Hoblyn et al. |
| 6,401,455 B1 * | 6/2002 | Mathes et al. ........... 60/286 |
| 6,425,382 B1 | 7/2002 | Marthaler et al. |
| 6,427,671 B1 | 8/2002 | Holze |
| 6,430,929 B2 | 8/2002 | Martin |
| 6,442,933 B2 * | 9/2002 | Rusch ............... 60/286 |
| 6,443,675 B1 | 9/2002 | Kopras et al. |
| 6,449,947 B1 | 9/2002 | Liu et al. |
| 6,494,041 B1 | 12/2002 | Lebold |
| 6,651,773 B1 | 11/2003 | Marocco |
| 6,776,146 B1 | 8/2004 | Ricart-Ugaz et al. |
| 6,779,974 B2 | 8/2004 | Chien |
| 6,810,867 B2 | 11/2004 | Schmid et al. |
| 6,889,673 B2 | 5/2005 | Bender |
| 6,910,550 B2 | 6/2005 | Schlossarczyk et al. |
| 6,948,483 B2 | 9/2005 | Veinotte |
| 6,968,680 B2 | 11/2005 | van Nieuwstadt et al. |
| 7,025,663 B2 | 4/2006 | Kim |
| 7,028,680 B2 | 4/2006 | Liu et al. |
| 7,032,578 B2 | 4/2006 | Liu et al. |
| 7,140,357 B2 | 11/2006 | Wei et al. |
| 7,266,943 B2 | 9/2007 | Kammel |
| 7,316,109 B2 | 1/2008 | Clerc et al. |
| 7,326,028 B2 | 2/2008 | Morando |
| 7,328,572 B2 | 2/2008 | McKinley et al. |
| 7,434,696 B2 | 10/2008 | Soto |
| 7,461,506 B2 | 12/2008 | McNally et al. |
| 7,481,986 B2 | 1/2009 | Gabrielsson et al. |
| 7,490,467 B2 * | 2/2009 | Cummings ............... 60/324 |
| 7,624,722 B2 | 12/2009 | Matthews |
| 7,712,305 B2 | 5/2010 | Kapsos et al. |
| 7,735,316 B1 | 6/2010 | Toney |
| 7,797,937 B2 | 9/2010 | Endicott et al. |
| 7,814,745 B2 * | 10/2010 | Levin et al. ............... 60/286 |
| 7,856,807 B2 * | 12/2010 | Gibson ............... 60/286 |
| 7,908,848 B1 | 3/2011 | Toney |
| 8,371,114 B2 * | 2/2013 | Hayashi et al. ............... 60/317 |
| 2002/0110047 A1 | 8/2002 | Bruck et al. |
| 2003/0111065 A1 | 6/2003 | Blum |
| 2005/0013756 A1 | 1/2005 | Amou et al. |
| 2005/0161283 A1 | 7/2005 | Emler |
| 2005/0217929 A1 | 10/2005 | Kicinski |
| 2005/0217931 A1 | 10/2005 | Assad |
| 2006/0112683 A1 | 6/2006 | Huber |
| 2006/0266022 A1 | 11/2006 | Woerner et al. |
| 2007/0039318 A1 | 2/2007 | Krajewski et al. |
| 2007/0095057 A1 | 5/2007 | Field et al. |
| 2007/0163247 A1 | 7/2007 | Ryan et al. |
| 2008/0099276 A1 | 5/2008 | Bach |
| 2008/0104956 A1 | 5/2008 | Delvecchio et al. |
| 2009/0031714 A1 | 2/2009 | Jochumsen et al. |
| 2009/0035194 A1 | 2/2009 | Robel et al. |
| 2010/0212301 A1 | 8/2010 | De Rudder et al. |
| 2011/0016856 A1 | 1/2011 | Wirth |
| 2011/0088375 A1 | 4/2011 | Suzuki et al. |

FOREIGN PATENT DOCUMENTS

| | | |
|---|---|---|
| WO | 2008139942 A1 | 11/2008 |
| WO | 2011053013 A2 | 5/2011 |
| WO | 2011073717 A1 | 6/2011 |

OTHER PUBLICATIONS

CN 200780002423.5 Office Action, Feb. 12, 2010.

* cited by examiner

REDUCTANT DECOMPOSITION SYSTEM

CROSS-REFERENCE TO RELATED APPLICATIONS

This application is a continuation of U.S. patent application Ser. No. 12/753,632, filed Apr. 2, 2010, which claims the benefit of U.S. Provisional Patent Application No. 61/166,159, filed Apr. 2, 2009. These applications are incorporated herein by reference.

FIELD

This invention relates to exhaust systems for internal combustion engines, and more particularly to a reductant decomposition system for a selective catalytic reduction (SCR) catalyst of an exhaust aftertreatment system.

BACKGROUND

Exhaust aftertreatment systems receive and treat exhaust gas generated from an internal combustion engine. Typical exhaust aftertreatment systems include any of various components configured to reduce the level of harmful exhaust emissions present in the exhaust gas. For example, some exhaust aftertreatment systems for diesel powered internal combustion engines include various components, such as a diesel oxidation catalyst (DOC), particulate matter filter or diesel particulate filter (DPF), and a selective catalytic reduction (SCR) catalyst. In some exhaust aftertreatment systems, exhaust gas first passes through the diesel oxidation catalyst, then passes through the diesel particulate filter, and subsequently passes through the SCR catalyst.

Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst catalyst reduces the amount of nitrogen oxides ($NO_x$) present in the exhaust gas.

The SCR catalyst is configured to reduce $NO_x$ into less harmful emissions, such as N2 and $H_2O$, in the presence of ammonia ($NH_3$). Because ammonia is not a natural byproduct of the combustion process, it must be artificially introduced into the exhaust gas prior to the exhaust gas entering the SCR catalyst. Typically, ammonia is not directly injected into the exhaust gas due to safety considerations associated with the storage of liquid ammonia. Accordingly, conventional systems are designed to inject a urea-water solution into the exhaust gas, which is capable of decomposing into ammonia in the presence of the exhaust gas. SCR systems typically include a urea source and a urea injector or doser coupled to the source and positioned upstream of the SCR catalyst.

Generally, the decomposition of the urea-water solution into gaseous ammonia occupies three stages. First, urea evaporates or mixes with exhaust gas. Second, the temperature of the exhaust causes a phase change in the urea and decomposition of the urea into isocyanic acid (HNCO) and water. Third, the isocyanic acid reacts with water in a hydrolysis process under specific pressure and temperature concentrations to decompose into ammonia and carbon dioxide ($CO_2$). The ammonia is then introduced at the inlet face of the SCR catalyst, flows through the catalyst, and is consumed in the $NO_x$ reduction process. Any unconsumed ammonia exiting the SCR system can be reduced to $N_2$ and other less harmful or less noxious components using an ammonia oxidation catalyst.

To sufficiently decompose into ammonia, the injected urea must be given adequate time to complete the three stages. The time given to complete the three stages and decompose urea into ammonia before entering the SCR catalyst is conventionally termed residence time. Prior art exhaust aftertreatment systems utilize a long tube of a fixed linear decomposition length that extends between the urea injector and SCR catalyst inlet face. The fixed linear decomposition length of prior art systems must be quite long in order to provide the necessary residence time. Long tubing for urea decomposition often often takes up valuable space that could be occupied by other vehicle components and influences the design of the exhaust aftertreatment system.

Additionally, although some prior art exhaust aftertreatment systems that utilize long decomposition tubing may provide sufficient time for urea decomposition, often such systems do not provide adequate mixing of the urea/ammonia with the exhaust gas. Inadequate mixing results in a low ammonia vapor uniformity index, which can lead to crystallization/polymerization buildup inside the SCR catalyst or other SCR system components, localized aggregation of ammonia, inadequate distribution of the ammonia across the SCR catalyst surface, lower $NO_x$ conversion efficiency, and other shortcomings.

Further, many exhaust aftertreatment systems fail to adequately distribute exhaust gas across the inlet face of the SCR catalyst. An uneven distribution of exhaust gas at the SCR catalyst inlet can result in excessive ammonia slip and less than optimal $NO_x$ conversion efficiency. For example, a low exhaust flow distribution index at the SCR catalyst inlet results in a lower amount of SCR catalyst surface area in contact with the exhaust gases. The lesser the catalyst surface area in contact with the exhaust gases, the lower the $NO_x$ reduction efficiency of the SCR catalyst.

SUMMARY

The subject matter of the present application has been developed in response to the present state of the art, and in particular, in response to the problems and needs in the art that have not yet been fully solved by currently available exhaust aftertreatment systems employing an SCR system. Accordingly, the subject matter of the present application has been developed to provide a reductant decomposition system and associated apparatus and methods that overcomes at least some of the following or other shortcomings of the prior art reductant decomposition techniques.

In one representative embodiment, a reductant decomposition system includes an exhaust gas chamber comprising an inlet and outlet. The system also includes a first exhaust gas distribution component positioned within the chamber and communicable in exhaust gas receiving communication with the outlet. The first exhaust gas distribution component causes swirling exhaust gas flow patterns within the exhaust gas chamber. Additionally, the system includes a second exhaust gas distribution component positioned within the chamber and communicable in exhaust gas providing communication with the inlet. The second exhaust gas distribution component includes features that cause a swirling exhaust gas flow pattern within a space defined by the second exhaust gas distribution component. Further, the system includes a reductant injector coupled to the exhaust gas chamber. The reductant injector is communicable in reductant injecting communication with exhaust gas within the chamber.

In some implementations of the system, the inlet and outlet of the exhaust gas chamber are substantially coplanar. The exhaust gas chamber comprises a width and a length where the width is at least about 0.25 times the length. In certain implementations, a reductant decomposition length of the exhaust aftertreatment system is longer than an axial length between the inlet and outlet of the exhaust gas chamber. In yet some implementations, a height of the exhaust gas chamber proximate the first exhaust gas distribution component is greater than a height of the exhaust gas chamber proximate the proximate the second exhaust gas distribution component.

In some implementations of the system, the first exhaust gas distribution component includes a first set of small perforations and a second set of large perforations. The small perforations of the first set face toward the reductant injector and the large perforations of the second set face away from the reductant injector. The first set of small perforations can be configured to produce turbulent exhaust flow and second set of large perforations can be configured to produce substantially convective exhaust flow.

In some implementations, the first exhaust gas distribution component includes a perforation tube having a first open end, a second partially closed end, and a sidewall extending between the first open and second closed ends. The perforation tube can include a plurality of perforations formed in the sidewall and partially closed end. The plurality of perforations may include a first set of perforations formed in the second partially closed end, a second set of perforations formed in a first portion of the sidewall, and a third set of perforations formed in a second portion of the sidewall. The first set of perforations can define a first percent open area, the second set of perforations can define a second percent open area, and the third set of perforations can define a third percent open area. In certain implementations, the second percent open area is greater than the first percent open area and the third percent open area is greater than the second percent open area.

In yet other implementations, the second exhaust gas distribution component includes a plurality of blades and corresponding slots configured to create an exhaust gas vortex within the second exhaust gas distribution component. The second exhaust gas distribution component can also include a contraction tube having an open end, closed end, and a sidewall extending between the open and closed ends. The plurality of blades and slots can extend lengthwise along at least a portion of the sidewall. In some implementations, each of the plurality of blades are angled with respect to the sidewall at a location proximate each blade where each blade extends outwardly from an outer surface outer surface of the sidewall and inwardly from an inner surface of the sidewall. The angle formed between each of the plurality of blades and the sidewall at the location proximate each blade can be based on a distance between the open end of the contraction tube and an exhaust gas aftertreatment device downstream of the open end of the contraction tube.

According to another embodiment, an exhaust gas aftertreatment system includes a diesel particulate filter, a selective catalytic reduction catalyst, a urea decomposition chamber, and a urea injector coupled to the urea decomposition chamber. The decomposition chamber includes an inlet communicable in exhaust receiving communication with the diesel particulate filter and an outlet communicable in exhaust providing communication with the selective catalytic reduction catalyst. The urea injector is communicable in urea injecting communication with exhaust gas in the urea decomposition chamber.

The system can also include an exhaust distribution component that is positioned within the chamber and is communicable in exhaust receiving communication with the inlet of the chamber. The exhaust distribution component can include a first set of perforations each having a first area and a second set of perforations each having a second area. The first area is substantially larger than the second area.

Further, the system can include an exhaust distribution component that is positioned within the chamber and is communicable in exhaust gas providing communication with the outlet of the chamber. The exhaust distribution component can include a plurality of blades configured to swirl the exhaust gas within the exhaust distribution component to attain an improved distribution of reductant across the SCR catalyst inlet face within a short distance from the SCR catalyst. A shape of the urea decomposition chamber is defined by a height, length, and width where the length can be greater than the width and height, and the width can be greater than the height.

In some implementations, the cross-sectional shape of the urea decomposition chamber along a plane extending perpendicular to the first and second exhaust flow directions includes a first curved portion extending about the inlet and a second curved portion extending about the outlet. Exhaust gas from the diesel particulate filter flows from the inlet to the outlet of the urea decomposition chamber. The first and second curved portions promote swirling of exhaust gas within the urea decomposition chamber.

In another embodiment, a method for decomposing urea into ammonia includes passing exhaust gas through a perforation pattern and into a chamber. The perforation pattern causes the exhaust to swirl within the chamber, which promotes decomposition of injected urea by increasing gas entropy. According to the laws of gas kinetics, increasing gas entropy increases the rate of reaction. The method also includes injecting urea into the exhaust gas within the chamber. Additionally, the method includes passing exhaust gas within the chamber between a plurality of blades to further swirl the exhaust gas within the chamber.

In some implementations, the perforation pattern includes a plurality of first perforations each having a first size and a plurality of second perforations each having a second size larger than the first size, where passing exhaust gas through a perforation pattern includes passing exhaust gas through the first and second perforations. In the method, passing exhaust gas within the chamber between the plurality of blades can cause the exhaust gas to swirl prior to passing between the plurality of blades and after passing between the plurality of blades. Further, the plurality of blades can be positioned about a central axis, and the method can further include directing a portion of exhaust gas radially inward toward the central axis after the exhaust gas passes between the plurality of blades. The method might also include directing a portion of exhaust gas radially outward away from the central axis after the exhaust gas passes between the plurality of blades.

Reference throughout this specification to features, advantages, or similar language does not imply that all of the features and advantages that may be realized with the present invention should be or are in any single embodiment or implementation of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment or implementation.

The described features, advantages, and characteristics of the invention may be combined in any suitable manner in one or more embodiments and/or implementations. One skilled in the relevant art will recognize that the invention may be practiced without one or more of the specific features or advantages of a particular embodiment or implementation. In other instances, additional features and advantages may be recognized in certain embodiments and/or implementations that may not be present in all embodiments or implementations of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
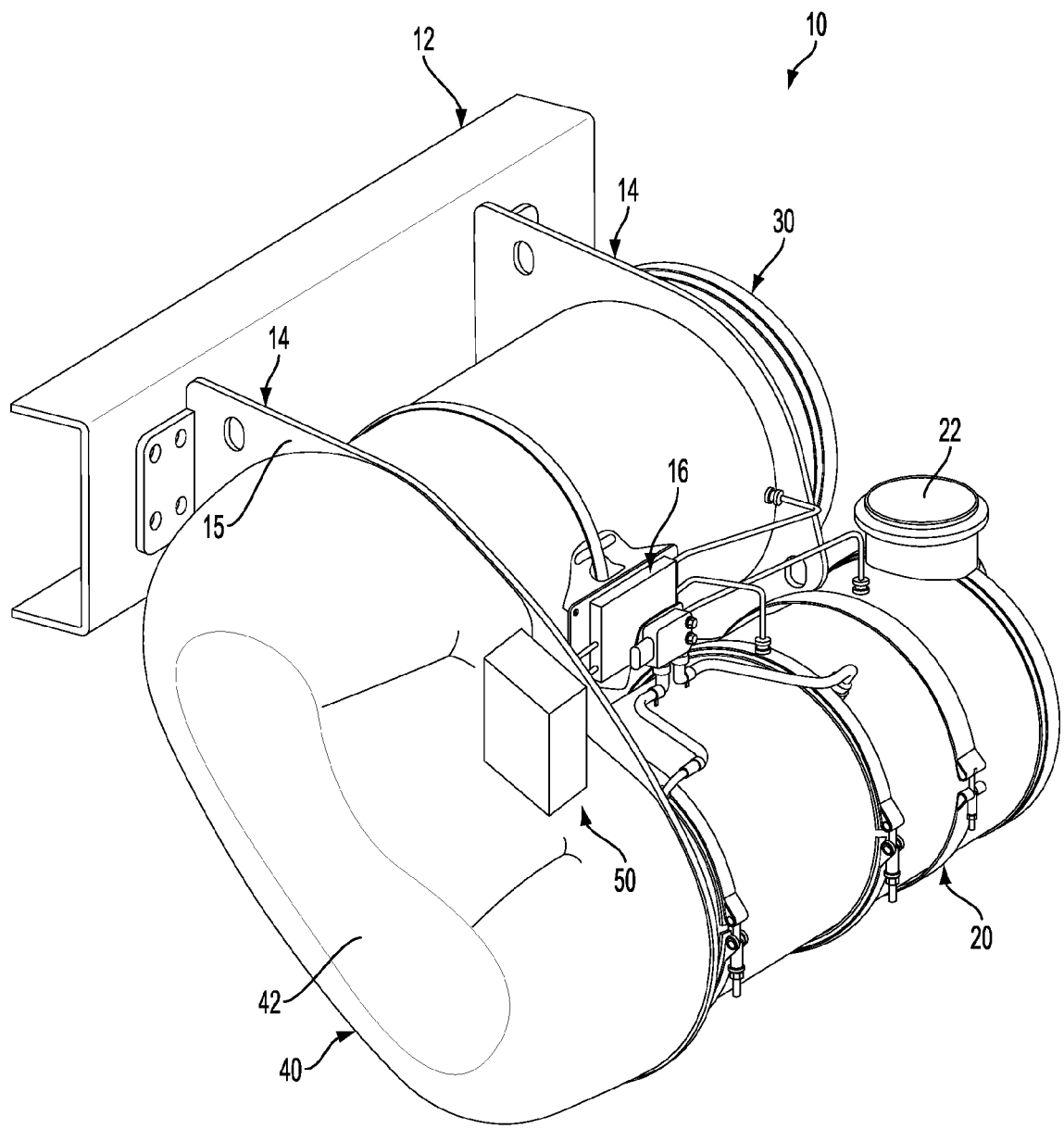
FIG. 1 is a perspective first end view of an exhaust aftertreatment system having a reductant decomposition system according to an embodiment.

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present invention, however, absent an express correlation to indicate otherwise, an implementation may be associated with one or more embodiments.

The described features, structures, or characteristics of the invention may be combined in any suitable manner in one or more embodiments. In the following description, numerous specific details are provided to impart a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Described herein are various embodiments of a reductant decomposition system and associated apparatus and methods for, among other things, enhancing the decomposition of a reductant, such as urea, to ammonia in an exhaust gas, improving the mixing of urea and ammonia with exhaust gas, and improving the exhaust flow distribution uniformity into the SCR catalyst. The reductant decomposition system forms part of an exhaust aftertreatment system that has an SCR system. Generally, in one embodiment, the reductant decomposition system includes a fixed volume chamber having an inlet and an outlet, a first exhaust gas distribution component proximate the inlet of the inlet of the chamber, and a second exhaust gas distribution component proximate the outlet of the chamber. In one implementation, the first exhaust gas distribution component includes a perforation pattern that creates a desirable exhaust flow pattern about the chamber that is conducive to mixing injected urea and urea decomposition byproducts with exhaust gas in the chamber. In yet one implementation, the second exhaust gas distribution component facilitates uniform distribution of exhaust gas at an inlet of the SCR catalyst. In certain implementations, the first and second exhaust gas distribution components, as well as the chamber, also increase the urea decomposition residence time, and the second exhaust gas distribution component also enhances mixing of the injected urea and urea decomposition byproducts with exhaust gas in the second exhaust gas distribution component. The reductant decomposition system also includes a reductant injector coupled to the chamber in reductant injecting communication with exhaust gas flowing through the chamber.

In one specific embodiment illustrated in FIG. 1, an exhaust aftertreatment system 10 is coupled to an internal combustion engine (not shown) and capable of receiving and treating exhaust gas generated by the engine. In certain implementations, the exhaust aftertreatment system 10 is secured to a vehicle in which the engine is housed. The system 10 can be secured at any of various locations on the vehicle using any of various fastening techniques and/or fastening devices. In the specific implementation shown in FIG. 1, the exhaust aftertreatment system 10 is secured to a frame rail 12 of a vehicle (not shown) using brackets 14.

Figure 2:
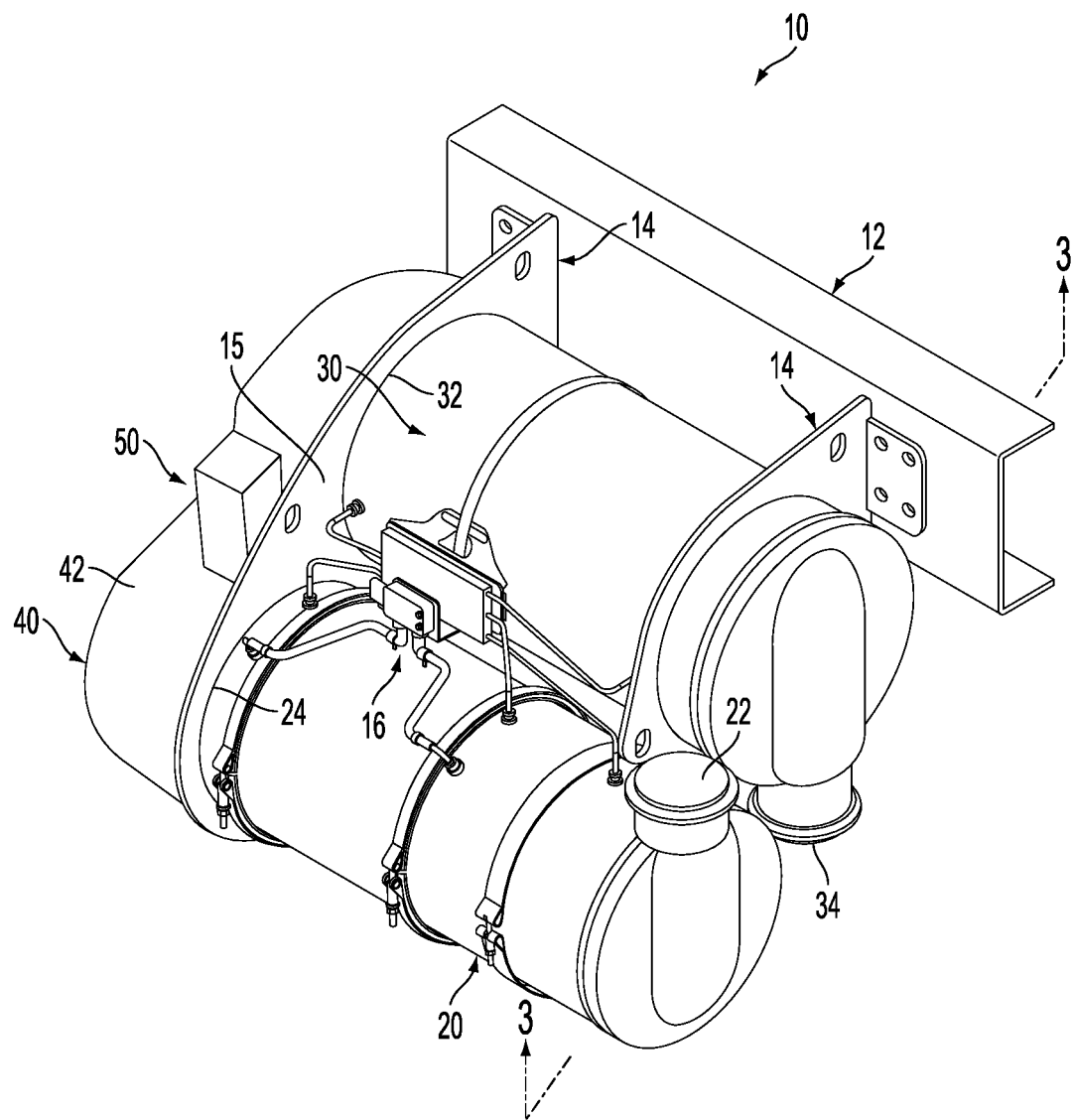
FIG. 2 is a perspective second end view of the exhaust aftertreatment system of FIG. 1.

The exhaust aftertreatment system 10 includes a first housing 20 and a second housing 30. The first housing 20 includes an exhaust gas inlet 22 and outlet 24 (see FIGS. 2 and 3). Similarly, the second housing 30 includes an exhaust gas inlet 32 and outlet 34. The inlet 22 of the first housing 20 and outlet 34 of the second housing 30 are proximate the same end of the exhaust aftertreatment system 10. Similarly, the outlet 24 of the first housing 20 and inlet 32 of the second housing 30 are proximate the same end of the exhaust aftertreatment system 10. In certain implementations, the outlet 24 and inlet 32 are substantially coplanar (see, e.g., FIG. 5).

Figure 3:
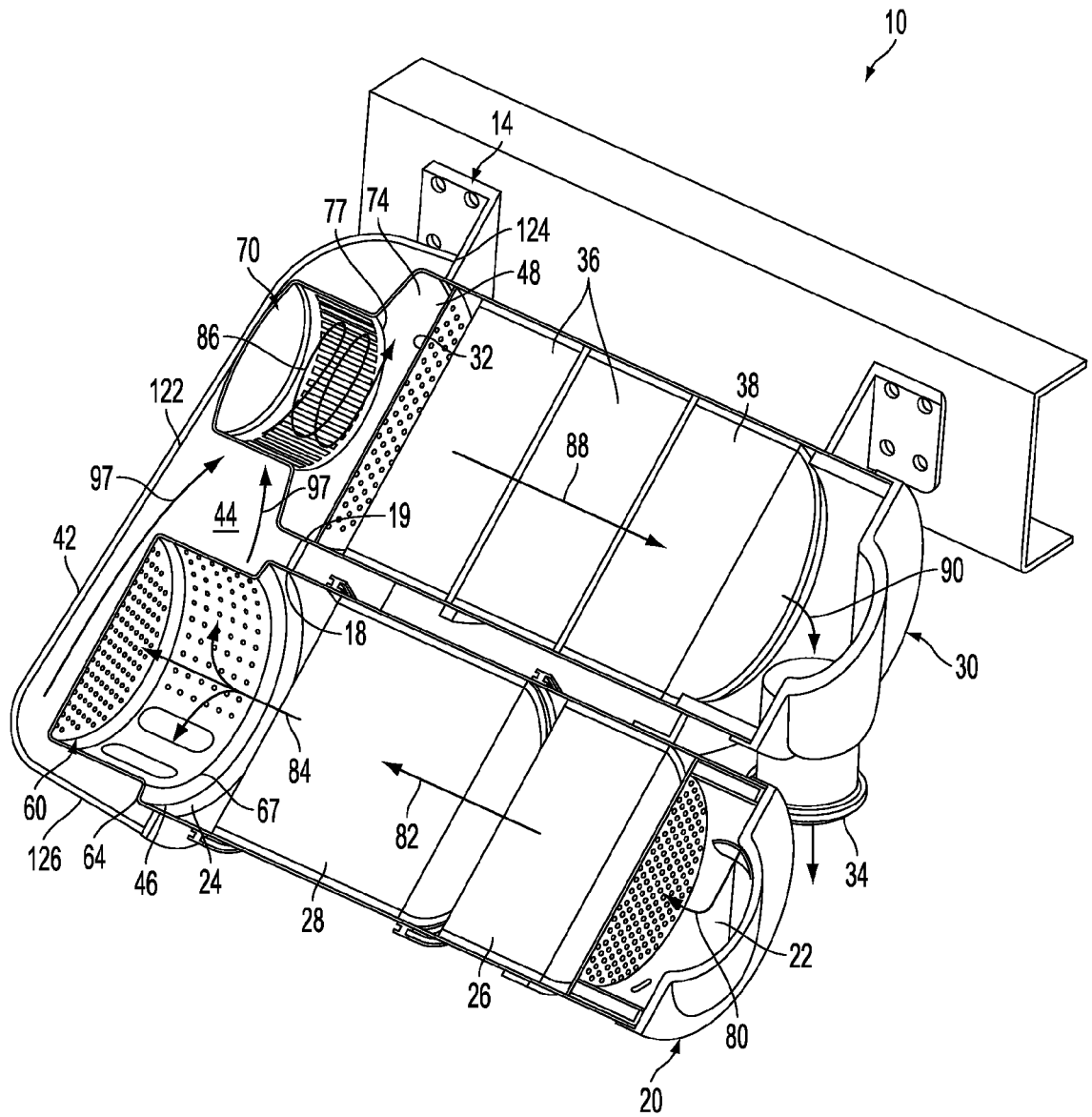
FIG. 3 is a cross-sectional view of the exhaust aftertreatment system as shown in FIG. 2 taken along the line 3-3 of FIG. 2.

Each of the first and second housings 20, 30 encloses and retains one or more exhaust treatment devices. Referring to FIG. 3, the first housing 20 encloses and retains a diesel oxidation catalyst (DOC) 26 and a diesel particulate filter (DPF) 28 downstream of the diesel oxidation catalyst. The second housing 30 encloses and retains a selective catalytic reduction (SCR) catalyst 36 and can also include an ammonia oxidation catalyst 38 downstream of the SCR catalyst. Although in the illustrated embodiment, the first and second housings 20, 30 enclose and retain the respective exhaust treatment devices 26, 28, 36, 38 in the order shown, in other embodiments, the first and second housings can enclose any number and types of exhaust treatment devices in any of various orders as desired without departing from the essence of the present invention. For example, the decomposition chamber 44 can receive exhaust gas directly from a DOC instead of a DPF. Preferably, however, the decomposition chamber 44 always precedes an SCR catalyst.

Control of the exhaust aftertreatment system 10 is at least partially dependent upon the conditions of exhaust gas flowing through the system. Conditions of the exhaust gas can be detected using various sensors positioned throughout the system. The conditions can include the concentrations of $NO_x$, CO, hydrocarbons, ammonia, and other constituents of the exhaust gas, as well as the temperature and flow rate of the exhaust gas. The sensors communicate detected conditions to a sensor module 16, which processes the signals received from the sensors and/or transmits the signals to an engine control module or similar device (not shown) for initial or further processing. Based at least partially on the detected conditions of the exhaust, the engine control module can control parameters of the engine and/or exhaust aftertreatment system to reduce harmful emissions in the exhaust gas as desired.

The inlet 32 of the second housing 30 is in exhaust receiving communication with the outlet 24 of the first housing 24 via a reductant decomposition system 40. The reductant decomposition system 40 includes an end cap 42 secured to an end plate 15 of the mounting bracket 14 to which the outlet 24 and inlet 32 are secured. When secured to the end plate 15, the interior surfaces of the end cap 42 and end plate 15 together define a decomposition chamber 44. The end cap 42 is secured to a downstream side of the end plate 15 over the first and second apertures 18, 19 (see, e.g., FIGS. 3 and 7). The downstream sides of the first and second apertures 18, 19 of the end plate 15 define an inlet 46 and outlet 48 of the decomposition chamber 44. The first housing 20 is secured to an upstream side of the end plate 15 over the first aperture 18 formed in the end plate and the second housing 30 is secured to the upstream side of the end plate over the second aperture 19 formed in the end plate. Accordingly, the upstream sides of the first and second apertures 18, 19 of the end plate 15 are approximately coextensive with the outlet 24 of the first housing and inlet 32 of the second housing 30.

Figure 5:
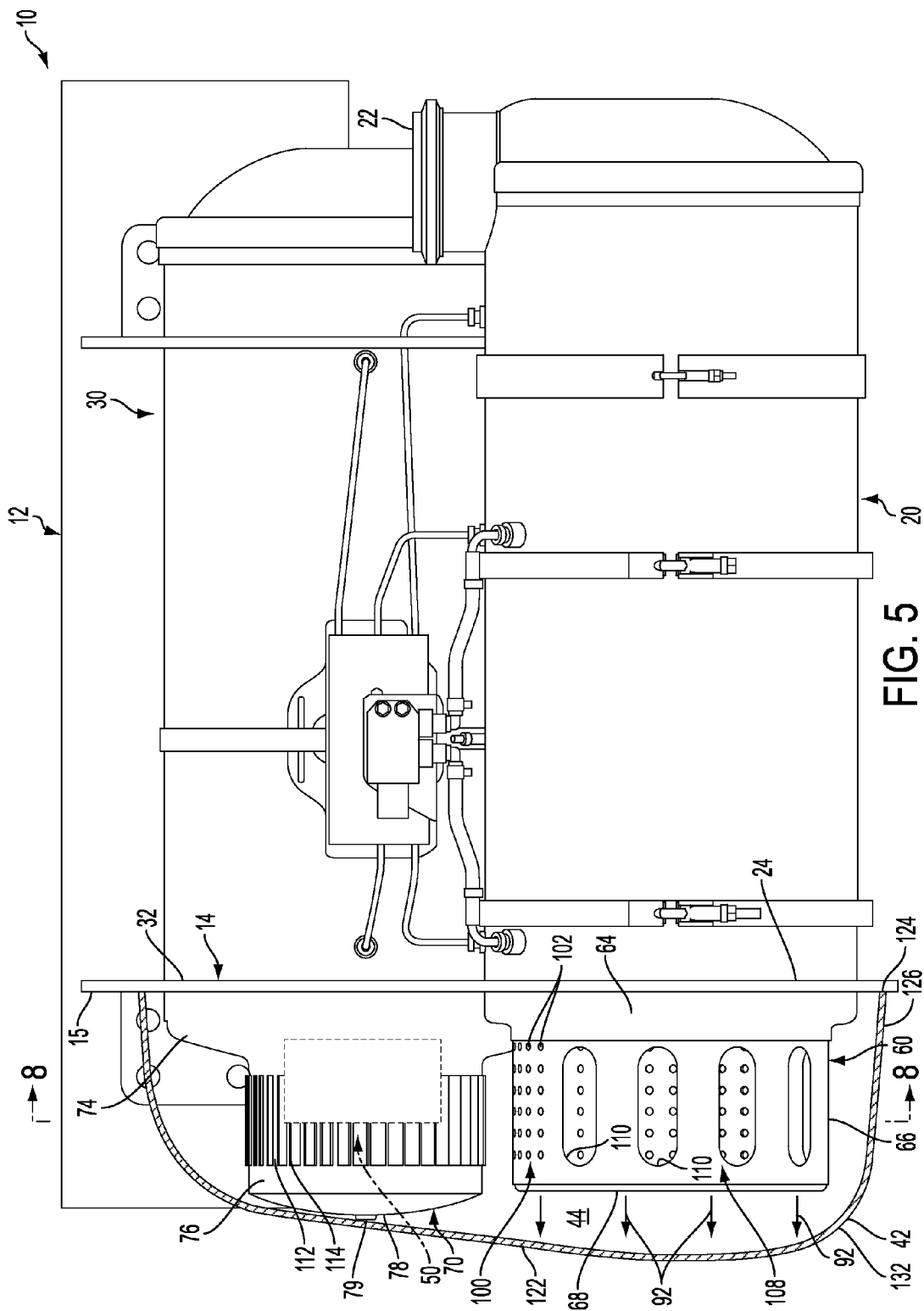
FIG. 5 is a side elevation view of the exhaust aftertreatment system of FIG. 1 shown with the end cap in cross-section.

The end plate 15 and end cap 42 are configured to define a specifically sized and shaped decomposition chamber 44. As defined herein, a chamber as defined herein is a substantially enclosed space having a substantially non-cylindrical shape. Additionally, a chamber as defined herein is substantially non-tubular in comparison to conventional linear reductant decomposition tubing used in typical SCR systems, which have a substantially tubular shape. Generally, in one embodiment, the decomposition chamber 44 is a non-linear and asymmetric space defined between the end plate 15 and end cap 42. In the specific illustrated embodiment shown in FIG. 3, the end cap 42 includes a substantially flat closed top wall 122, an open bottom 124 opposite the top wall, and a side wall 126 extending between the top wall and open bottom. Referring to FIG. 5, the side wall 126 gradually transitions into the top wall 122 via a curved edge 132 extending about the upper periphery of the end cap 42. The edge 132 is curved to facilitate swirling motion of exhaust within the decomposition chamber 44, as well as to minimize the space minimize the space occupied by the end cap 42. Additionally, in some embodiments, the decomposition chamber 44 has a shallow profile, i.e., a height substantially less than a length or width. Also, in certain embodiments, the cross-sectional shape of the decomposition chamber 44 defined perpendicular to the axial length of the chamber, which extends from the inlet 46 to the outlet 48, is substantially non-circular and asymmetrical.

The distance between the top wall 122 and open bottom 124 defines the height of the end cap 42 and thus the height of the decomposition chamber 44. The height of the end cap 42 can be greater proximate the first exhaust distribution component 60 compared to the height of the end cap proximate the second exhaust distribution component 70. As shown in FIG. 5, the height of the end cap 42 proximate the first exhaust distribution component 60 is sufficiently high to allow exhaust gas exiting first perforations 102 of a first perforation pattern 100 (see FIG. 4) to flow into the chamber 44 and away from the first exhaust distribution component without unnecessary restriction. Further, the height of the end cap 42 proximate the second exhaust distribution component is sufficiently low to allow the end 78 of the contraction tube 76 to be secured to the end cap. In some implementations, the decomposition chamber 44 can be an adjustable geometry decomposition chamber in which the component or components defining the decomposition chamber are reconfigurable to change the volume of the decomposition chamber.

Figure 7:
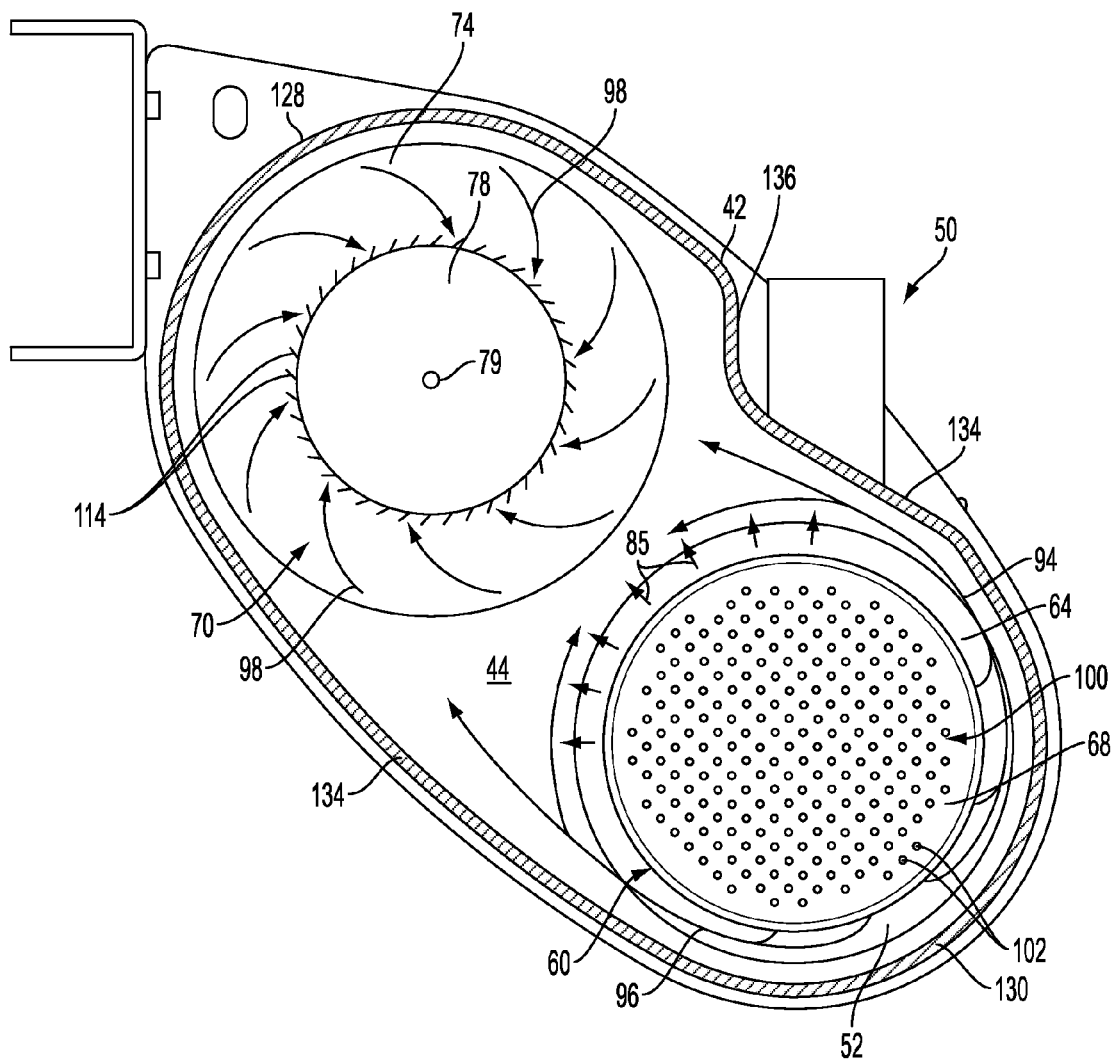
FIG. 7 is a plan view of the reductant decomposition system of FIG. 4 with the end cap in cross-section and showing exhaust flow patterns within a chamber of the reductant decomposition system according to an embodiment.

Referring to FIG. 7, in one embodiment, the shape of the end cap 42 and decomposition chamber 44 in plan is generally ovular-shaped. In some implementations, the shape of the end cap 42 and decomposition chamber 44 in plan can be described as generally bean-shaped such that the end cap includes a recess 136 for facilitating attachment of a reductant injector 50 to the end cap. Each of the top end 128 and bottom end 130 of the end cap 42 is curved to conform to the shape of the first and second exhaust distribution components 60, 70, respectively. The curvature of the top and bottom ends bottom ends 128, 130 facilitates swirling motion of exhaust within the decomposition chamber 44, as well as reduces the space occupied by the end cap 42.

The end cap 42 includes a width defined between generally opposing sides 134 of the end cap. The opposing sides 134 extend between the top and bottom ends 128, 138. In some embodiments, the width of the chamber 44 is between about 25% and 150% of an axial length of the chamber, which is defined as the distance between the inlet 46 and outlet 48 of the chamber. Accordingly, the chamber 44 has a substantially greater width to length ratio than conventional linear reductant decomposition tubes used in conventional SCR systems.

Further, although in the illustrated embodiments the decomposition chamber 44 is defined by the end cap 42 and a separate end plate 15 of the mounting bracket 14 to which the end cap is secured, in other embodiments, the decomposition chamber can be defined by a stand-alone enclosure or housing independent of a mounting bracket without departing from the essence of the invention. Generally, the decomposition chamber can be defined by any of various components or structures that alone or in combination with each other are capable of defining a reductant decomposition volume or space as described herein with a single exhaust inlet and outlet or a plurality of exhaust inlets and outlets.

Referring to FIG. 1, the reductant decomposition system 40 includes a reductant injector 50 secured to the end cap 42. Although a single reductant injector 50 in shown, in other embodiments, a plurality of reductant injectors can be used. The reductant injector 50 is in reductant receiving communication with a reductant source (not shown), such as a tank containing reductant, and includes a nozzle through which the reductant is injected into the decomposition chamber. The end cap 42 includes an aperture through which the nozzle of the reductant injector 50 may at least partially extend. In some implementations, the nozzle is substantially flush with the interior surface of the end cap 42. In other implementations, the nozzle extends a desirable distance into the distance into the decomposition chamber 44 as long as the sprayed reductant does not directly impinge on nearby metal surfaces and cause urea polymerization. The position of the nozzle relative to the chamber 44 is at least partially based on the penetration length of the reductant spray. Generally, the reductant injector 50 and nozzle are positioned such that injected reductant does not accumulate on an opposing or nearby surface of the end cap 42. The injector 50 is secured to the end cap 42 in a predetermined orientation such that the nozzle injects the reductant into the chamber 44 in a predetermined direction. Although reductant nearly immediately begins to dissipate in various directions after being injected into exhaust gas, the nozzle injects reductant in an initial injection direction usually in axial alignment with the nozzle. Preferably, the reductant is urea; however, other reductants may be used, such as ammonium formate solutions. The reductant injector 50 can be any of various reductant injectors known in the art. Because the exhaust gas can reach extreme temperatures and conventional reductant injector are sensitive to heat, in some embodiments, the end cap 42 can include insulation about the portion of the end cap to which the reductant injector 50 is secured.

The reductant injector 50 can be positioned at any of various locations about the end cap 42 to inject reductant into the decomposition chamber 44. Alternatively, in some implementations, the reductant injector 50 can be positioned and configured to inject reductant directly into the contraction tube 72. Such a configuration may avoid reductant contact with metal surfaces thereby avoiding reductant deposit formation on the surfaces.

Referring to FIG. 3, the reductant decomposition system 40 includes first and second exhaust distribution components 60, 70, respectively, positioned within the decomposition chamber 44. Generally, the first exhaust distribution component 60 receives exhaust gas from the first housing 20 and distributes the exhaust gas into the decomposition chamber 44 in a predetermined manner. Similarly, in general terms, the second exhaust distribution component 70 receives exhaust gas from the first distribution component 60 and distributes the exhaust gas within and from the second exhaust distribution component in a predetermined manner. The first and second exhaust distribution components 60, 70, in conjunction with the size and shape of the decomposition chamber 44, facilitate improved reductant mixing, longer reductant decomposition residence time, and more uniform flow distribution at the inlet face of an SCR catalyst compared to conventional linear exhaust tubing having the same axial length as the chamber. Because the decomposition chamber 44 does not need to be as long as conventional reductant decomposition tubes for providing the same or better reductant decomposition performance, the reductant decomposition system can be more compact and can occupy less volume than conventional reductant decomposition tubes while achieving a similar residence time.

Figure 4:
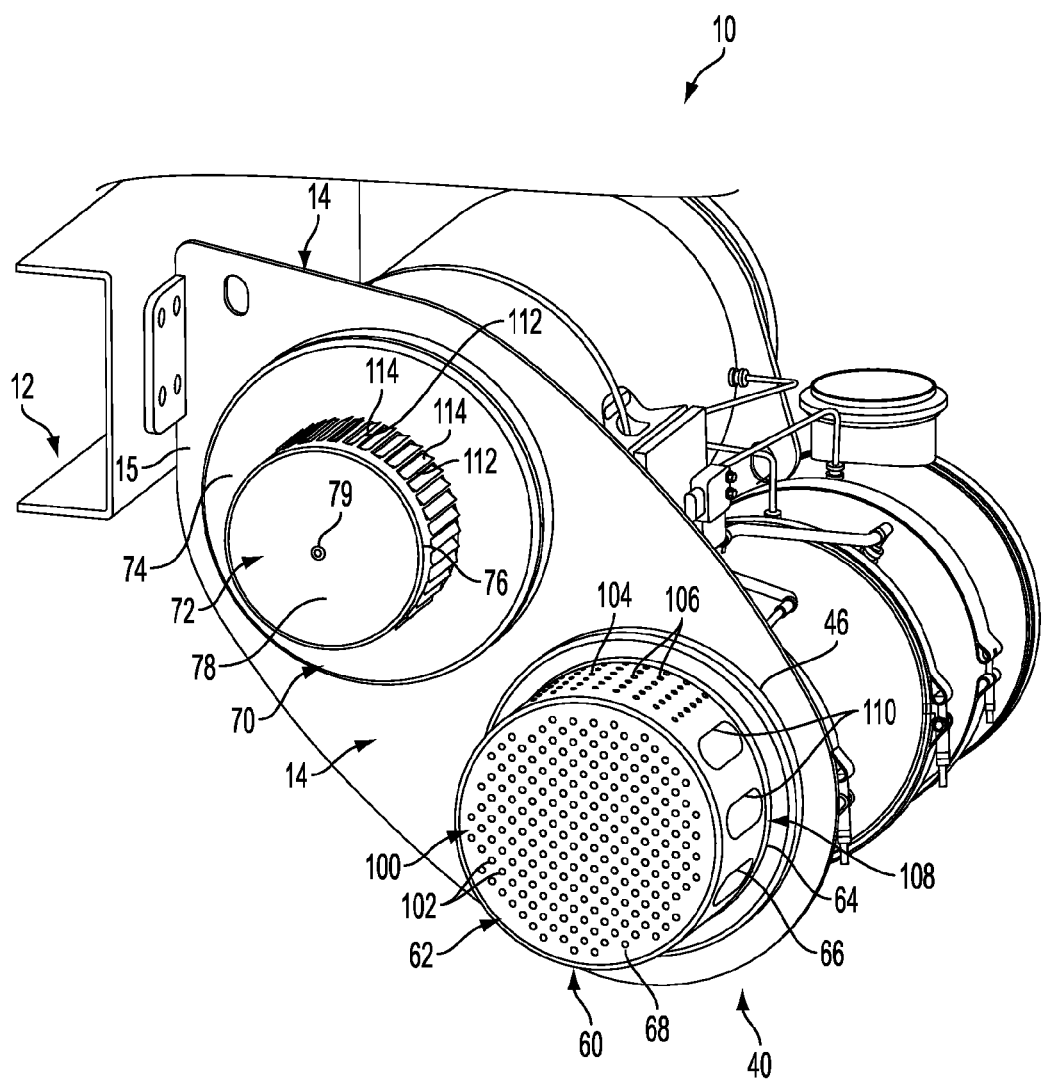
FIG. 4 is a perspective first end view of the exhaust aftertreatment system of FIG. 1 showing the reductant decomposition system with an end cap removed.

Referring to FIG. 4, the first exhaust distribution component 60 includes a perforation tube 62 and flange 64. The perforation tube 62 includes a side portion 66 that extends from an open upstream end 67 to a partially closed downstream end 68 (see FIG. 3). The flange 64 extends substantially radially outward away from the open end 67. The flange 64 is secured to the end plate 15 of the mounting bracket 14 about the first aperture 18 such that the first exhaust distribution component 60 effectively covers the aperture 18. In this manner, all exhaust gas flowing from the DPF 28, or any of various other emissions treatment devices, and exiting the first housing 20 enters the first exhaust distribution component 60. In certain implementations, the utmost upstream portion of the flange 64 is coextensive with the aperture 18. The perforation tube 62 can have a generally circular cross-section as shown or other cross-sectional shape as desired. Preferably, although not necessary, the cross-sectional area of the perforation tube 62 is only slightly smaller than the cross-sectional area of the first housing outlet 24.

The perforation tube 62 of the first exhaust distribution component 60 includes one or more perforations or apertures arranged in one or more patterns. Preferably, the perforation tube 62 includes perforations of various sizes and/or shapes. Each perforation pattern can include perforations of the same size and/or shape or perforations of different sizes and/or shapes. In the illustrated embodiment, the perforation tube 62 includes a first perforation pattern 100 formed in the end 68, a second perforation pattern 104 formed in the side 66, and a third perforation pattern 108 also formed in the side 66. Although three perforation patterns are shown, in other embodiments, the perforation tube 62 can include more or less than three perforation patterns.

The first perforation pattern 100 includes a plurality of first perforations 102 substantially evenly distributed across the end 68. The first perforations 102 each have the same size and shape. As shown, each of the first perforations 102 has a generally circular-shaped cross-section. Moreover, the first perforations 102 are sized and numbered to define a first percent open area of the first perforation pattern 100.

The second perforation pattern 104 includes a plurality of second perforations 106 substantially evenly distributed across a portion of the side 66. The second perforations 106 each have the same size and shape. As shown, each of the second perforations 106 has a generally circular-shaped cross-section. Moreover, the second perforations 106 are sized and numbered to define a second percent open area of the second perforation pattern 100.

The third perforation pattern 108 includes a plurality of third perforations 110 substantially evenly distributed across a portion of the side 66. In the illustrated embodiment, the third perforation pattern 108 includes five perforations 110. The third perforations 110 each have the same size and shape. As shown, each of the third perforations 110 has a generally ovular or racetrack-shaped cross-section. More specifically, the cross-sectional shape of the third perforations 110 includes two spaced-apart parallel sides connected at respective ends by a two curved sides. The parallel sides of the third perforations 110 are substantially parallel with a central axis of the perforation tube 62. The third perforations 110 are sized and numbered to define a third percent open percent open area of the third perforation pattern 108.

The first, second, and third percent open areas of the respective first, second, and third perforation patterns 100, 104, 108 are selected to achieve a desired flow pattern through the decomposition chamber and reduce exhaust backpressure. In one embodiment, the second percent open area is greater than the first percent open area, and the third percent open area is greater than the second percent open area. As will be described in more detail below, such a configuration is conducive to providing convective exhaust flow past the reductant injector 50, turbulent flow out the end 68 of the perforation tube, and lower flow restraint to reduce exhaust backpressure. In certain implementations, the first percent open area is between about 10% and about 30%, the second percent open area is between about 20% and 45%, and the third percent open area is between about 45% and 80%. In one specific implementation, the first percent open area is about 20%, the second percent open area is about 35%, and the third percent open area is about 50%. Although the second percent open area is greater than the first percent open area and the third percent open area is greater than the second percent open area in the illustrated embodiment, in other embodiments, the first percent open area can be more than the second percent open area and the third percent open area can be less than the first and/or second open areas as desired without departing from the spirit of the invention.

Generally, the smaller the perforation size, the more homogenous and isotropic the exhaust gas turbulent flow just downstream of the perforation. As the perforations increase in size, the exhaust gas restriction decreases, and the resultant exhaust gas flow rate increases, causing more powerful convective flow patterns. Reductant injected into turbulent flow mixes with exhaust gas on a smaller scale, e.g., millimeter scale, than with convective flow, e.g., inches scale, because the convective transport process is enhanced with flow patterns having a higher mean velocity compared to flow patterns having turbulent fluctuations. In other words, turbulent flow can have a much shorter mixing length than convective flow. Accordingly, in certain applications, it may be desirable to produce a circulating flow past the reductant injector nozzle such that initial mixing of the reductant with exhaust gas is performed quickly and efficiently via convective flow. Following initial mixing via convective flow, it would be desirable to introduce the circulating flow with turbulent flow to further mix the reductant with exhaust gas.

To produce organized convective flow past the reductant injector nozzle and turbulent flow downstream of the nozzle, the second and third perforation patterns 100, 108 are strategically placed on respective portions of the side 66 of the perforation tube 62 such that exhaust gas exits the perforations 106, 110 in a desirable manner and direction. The smaller second perforations 106 are configured to create turbulent flow just downstream of the perforations 106. In contrast, the much larger third perforations 110 are configured to create substantially convective flow circumferentially around the perforation tube 62 in both a counterclockwise direction (see, e.g., exhaust flow 94 in FIG. 7) and clockwise direction (see, e.g., exhaust flow 96 in FIG. 7). The portions of the side 66 on which the second and third perforation patterns 104, 108 are located is based on the direction the perforations 106, 110 face relative to the reductant injection direction of the injector nozzle. Generally, the second perforations 106 of the second perforation pattern 104 face toward the reductant injector nozzle, i.e., the second perforations face a direction that forms an angle with the reductant injection direction that is less than or equal to about 90-degrees. In contrast, the third perforations 110 of the third perforation pattern 108 face away from the reductant injector nozzle, i.e., the third perforations face a direction that forms an angle with the reductant injection direction that is more than about 90-degrees.

The perforations of a particular pattern need not be all the same size and shape as shown in the illustrated embodiment. Moreover, the perforations of a pattern need not be evenly distributed across a surface. For example, in some embodiments, a perforation pattern can include perforations of varying sizes and varying distances between between the perforations. In one specific implementation, the perforations of the first perforation pattern can gradually increase in size in a radially inward direction. In some implementations, the configurations of the perforation patterns can be selected to achieve a desired acoustical effect.

Figure 6:
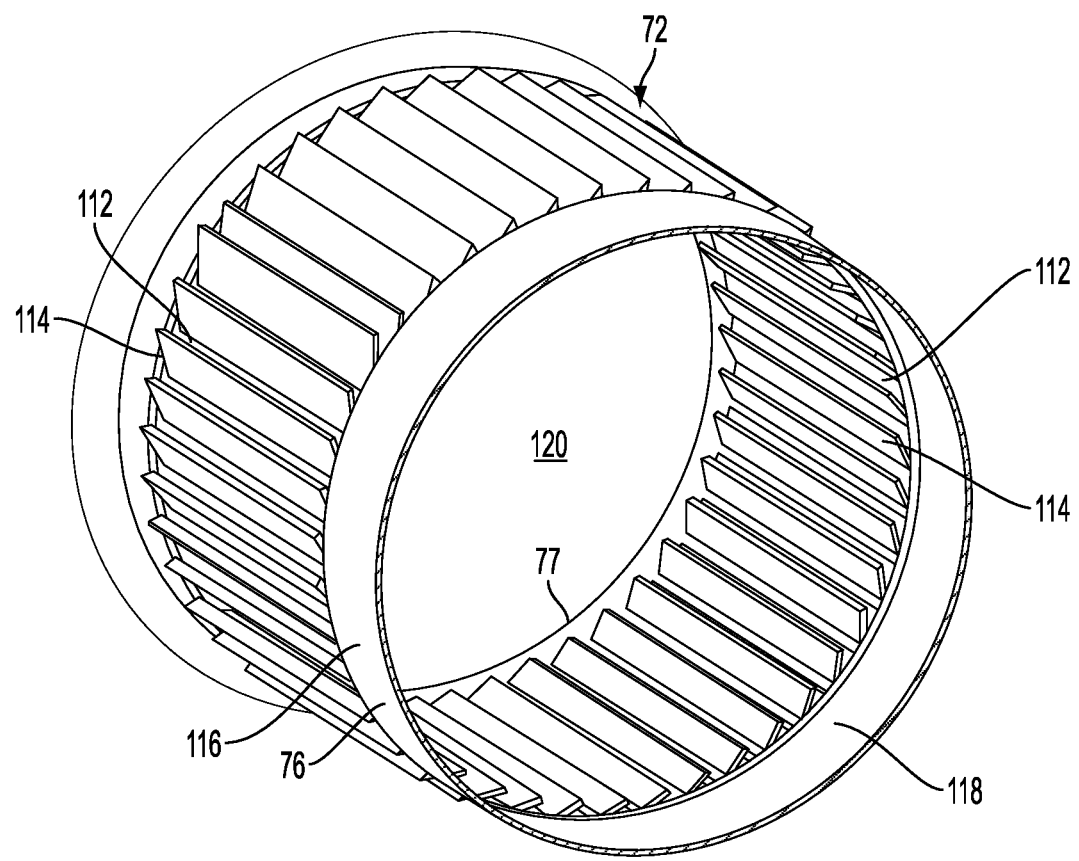
FIG. 6 is a perspective view of a contraction tube of an exhaust distribution component of the reductant decomposition system of FIG. 4 shown with a closed end of the component removed.

Referring to FIGS. 4 and 6, the second exhaust distribution component 70 includes a contraction tube 72 and a flange 74. The contraction tube 72 includes a side portion 76 that extends from an open upstream end 77 (see FIGS. 3 and 6) to a closed downstream end 78. The flange 74 extends substantially radially outward away from the open end 77. The flange 74 is secured to the end plate 15 of the mounting bracket 14 about the second aperture 19 such that the second exhaust distribution component 70 effectively covers the aperture 19. In this manner, all exhaust flowing from the first exhaust distribution component 60 and through the decomposition chamber 44 enters the second exhaust distribution component 70. In certain implementations, the utmost upstream portion of the flange 74 is coextensive with the aperture 18. To reduce vibrations in the second exhaust distribution component 70, the downstream end 78 of the contraction tube 72 can be secured to the end cap 42. In some instances, the downstream end 78 includes a protrusion or knob 79 to facilitate securing the downstream end to the end cap 78. In some implementations, the end cap 42 includes a corresponding recess for receiving the knob 79, which can be secured to the end cap via a snap-fit connection, welding, or other similar attachment mechanism or technique.

Figure 8:
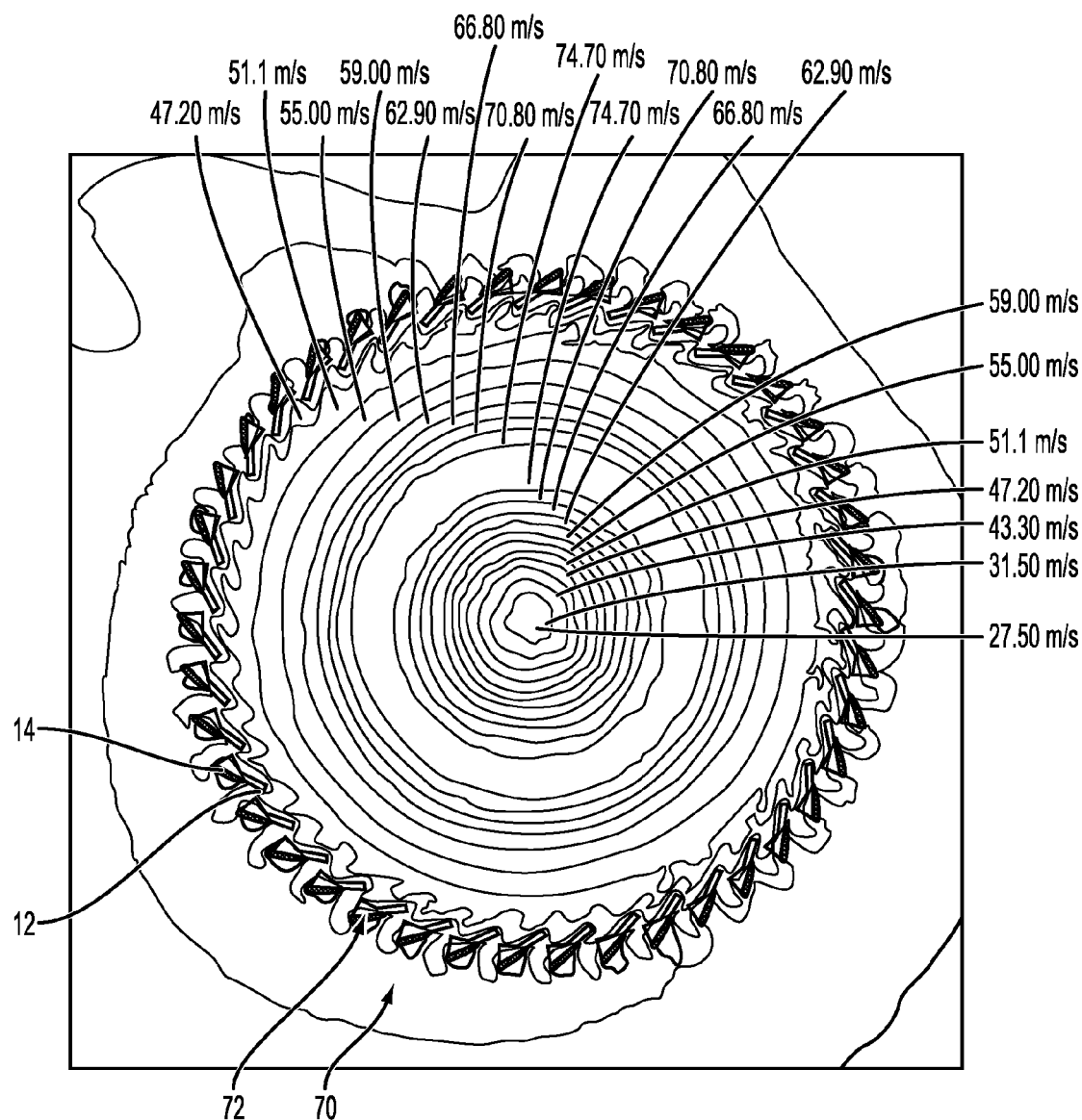
FIG. 8 is a cross-sectional plan view of the exhaust distribution component of FIG. 6 showing a velocity contour plot of exhaust gas flow within the component according to a specific embodiment.

The contraction tube 72 includes a plurality of elongate slots 112 and corresponding blades 114 positioned about a perimeter of the tube (see, e.g., FIGS. 6 and 8). In the illustrated embodiment, the slots 112 and blades 114 are "in-line," e.g., they extend lengthwise in a direction parallel to a central axis of the contraction tube 72 from a location proximate the open end 77 to a location proximate the closed end 78. In certain implementations, the slots 112 and blades 114 extend the entire length of the contraction tube 72 and in other implementations, the slots and blades extend only a portion of the portion of the contraction tube 72. Preferably, although not necessary, the slots 112 and blades 114 extend a substantial portion of the length of the contraction tube 72. In one embodiment, as shown in FIG. 6 with the closed end 78 removed for convenience, each slot 112 is defined between two adjacent blades 114. The number and size of the slots 112 and blades 114 can be based on any of several factors, such as a desired angular rate of rotation of exhaust within the tube 72, manufacturing and materials costs, and exhaust flow impedance or restriction.

In the illustrated embodiment, a portion of each blade 114 extends outwardly beyond an outer surface 116 of the contraction tube 72 and a portion of each blade extends inwardly beyond an inner surface 118 of the contraction tube 72. Each blade 114 is angled with respect to the outer and inner surfaces of the contraction tube 72 proximate each blade. In one implementation, the angle of the blades 114 is based on the distance between the open end 77 of the contraction tube 76 and the inlet face 37 of the SCR catalyst 36. Preferably, each blade 114 forms the same angle with respect to the contraction tube 72 surfaces proximate each blade. The blades 114 are configured to force exhaust gas to enter through the slots 112 at an angle relative to a radial direction of the contraction tube, as well as the contraction tube surfaces proximate each blade. As will be described in more detail below, the initial angling of the exhaust gas into the circular contraction tube 72 causes the exhaust gas to swirl within an interior 120 of the contraction tube, which in some instances, causes a vortex exhaust flow pattern within the contraction tube.

Although the slots 112 and blades 114 in the illustrated embodiments are identically shaped and oriented, in other embodiments, some slots have different shapes and orientations relative to other slots and some blades have different shapes and orientations relative to other blades. Additionally, the slots 112 and blades 114 need not extend parallel to a central axis of the contraction tube 76 in the lengthwise direction, but could extend at an angle relative to the central axis.

In some embodiments, the contraction tube 72 includes slots 112 formed in the side 76, but does not include blades 114 extending from the side 76. Rather, the blades 114 can be stationary fan blades positioned within the interior 120 of the contraction tube 72. In such an embodiment, exhaust gas enters the slots 112 in a direction substantially parallel to the radial direction. The exhaust gas then engages the stationary fan blades within the contraction tube 72, which causes the swirling action of the exhaust gas. In certain implementations, the contraction tube 72 can include slots 112 and blades 114 as shown in FIG. 6, as well as a stationary fan blade positioned within the tube.

The contraction tube 72 can have a generally circular cross-section as shown or other cross-sectional shape as desired. The cross-sectional area of the contraction tube 72 can be any of various sizes. In certain implementations, the diameter of the contraction tube 72 is between about 30% and about 100% of the diameter of the decomposition chamber outlet 38. In the specific embodiment illustrated, the diameter of the contraction tube 72 is about 85% of the diameter of the chamber outlet 38 (see, e.g., FIG. 7). However, in another specific embodiment, the diameter of the contraction tube 72 is about 55% of the diameter of the chamber outlet 38 (see, e.g., FIG. 9). As will be described in more detail below, the diameter of the contraction tube 72 affects the performance of the second exhaust distribution component 70.

Although the contraction tube 72 is being used in an SCR system to uniformly distribute exhaust gas, reductant, and decomposed reductant over the inlet face of an SCR catalyst, in other embodiments, the contraction tube 72 can be used to uniformly distribute any gas over the inlet face of any exhaust aftertreatment device.

The various components of the exhaust aftertreatment system 10 can be made from any of a variety of materials as desired. Most of the components are made from materials capable of withstanding high temperatures, such as metal, e.g., steel and steel alloys. For example, in certain implementations, the first and second housings 20, 30, 30, brackets 14, end cap 15, first exhaust distribution component 60, and second exhaust distribution component 70 are made from a steel or steel alloy. The various components can be coupled to each other using any of various devices, such as fastening mechanisms and/or coupling techniques, such as welding, known in the art. In some embodiments, the reductant injector 50 is secured to the end cap 42 via fasteners. In some embodiments, the housings 20, 30 are welded to the mounting brackets 14, the end cap 42 is welded to the end plate 15, and the first and second exhaust distribution components 60, 70 are welded to the end plate.

Referring to FIG. 3, in operation, exhaust gas enters the inlet of the first housing at 80 and flows into an inlet of the DOC 26. From the DOC 26, exhaust gas flows through the inlet of the DPF 28 at 82. Exhaust gas flowing through the DPF 28 exits the DPF and flows through the outlet 24 of the first housing 24, through the first aperture 18 of the end plate 15, through the inlet 46 of the decomposition chamber 44, and into the first exhaust distribution component at 84.

After entering the first exhaust distribution component 84, a portion of the exhaust gas flows through the first perforation pattern 100 at 92 (see FIG. 5), a portion flows through the second perforation pattern 104 at 85 (see FIG. 7), and a portion flows through the third perforation pattern 108 at 94, 96 (see FIG. 7). The relative amounts of exhaust gas flowing through the respective patterns are based on the location and configuration of the patterns. Because of the larger size of the third perforations 110, the flow rate coming out of the third perforations 110 is relatively higher compared to the flow rate coming out of the smaller sized perforations 102, 106. As shown in FIG. 7, a lower portion of the end cap 42 is shaped to correspond with the circumference of the perforation tube 62 and sized to provide a relatively narrow channel 52 defined between the end cap and a portion of the side 66 of the perforation tube. The channel 52 is configured to receive the flow with the relatively higher flow rate from the third perforations 110 and direct the convective flow through the channel. Exhaust gas exiting upper third upper third perforations 110 is combined into convective flow through the channel in a counterclockwise direction at 94 and exhaust gas exiting lower third perforations 110 is combined into convective flow through the channel in a clockwise direction at 96. The convective exhaust flow 94 exits the channel 52 in a direction toward the nozzle of the reductant injector 50, flows past the reductant injector nozzle where it picks up injected reductant, and disperses, at least partially, toward the second exhaust distribution component 70. The convective exhaust flow 96 exits the channel 52 and disperses, at least partially, toward the second exhaust distribution component 70.

The reductant decomposition system 40 is configured to direct exhaust gas through the decomposition chamber 44 in substantially non-linear, swirling flow patterns. The exhaust flow 94, 96 facilitated by the third perforation pattern 108 at least partially drives the non-linear, swirling flow patterns within the chamber 44. As the convective exhaust flow 94, 96 disperses, flow with relatively lower flow rates from the second perforation pattern 104 at 85 engages the convective flow to enhance mixing of the reductant in convective flow 94 with other exhaust in the chamber 44. To further enhance mixing, a substantial portion of the dispersed convective flow 96 wraps around perforation tube 62 to violently engage and mix with a substantial portion of the dispersed convective flow 94. In certain implementations, about 60% to about 80% of the exhaust flowing into the perforation tube 62 flows through the apertures 110 of the third perforation pattern 108. The combination of exhaust flows exiting the perforation tube 62 at 85, 92, 94, 96 at least partially mix and flow through the decomposition chamber 44 toward the second exhaust distribution component 70 as indicated by directional arrows 97. The flow 97 eventually partially swirls about the second exhaust distribution component 70 as indicated by directional arrows 98 just prior to entering the component through the slots 112.

The slots 112 and blades 114 are configured to create an exhaust gas vortex within the contraction tube 72. As the exhaust gas flows through the slots 112, the blades 114 act to redirect the flow toward the side 76 of the contraction tube 72 in a swirling pattern about a central axis of the tube at 86. As the exhaust swirls it slowly moves in an axial direction and descends radially inward toward the central axis. Referring to FIG. 8, the swirling exhaust gas picks up speed in the circular direction, i.e., increasing angular rate of rotation, as it descends radially inward until it reaches a maximum angular rate of rotation. The local static pressure of the exhaust gas is lowest at the location of maximum angular rate of rotation. The reduced local static pressure results in a reduction in the partial vapor pressure of urea in the exhaust, which promotes evaporation and diffusion (e.g., mixing) of the urea with exhaust. Accordingly, the higher the maximum angular rate of rotation, the greater the mixing of urea with exhaust. Also, the low pressure location provides a vacuum effect to radially draw in the exhaust gas circulating about the radially outward portion of the interior 120.

Ideally, the exhaust gas reaches a maximum angular rate of rotation at the central axis of the tube 72. However, in some implementations as shown in FIG. 8, the exhaust reaches a maximum rate of rotation at a radial location between the side 76 of the contraction tube 72 and the central axis of the tube. From there, the rate of rotation of the exhaust gas decreases as the exhaust gas continues to flow radially inward. FIG. 8 depicts one specific implementation having a rate of rotation of about 47.20 m/s at a radially outermost portion of the interior 120 of the contraction tube 72 and a maximum rate of rotation of about 74.70 m/s. It is recognized that the number, size, and angle of the vanes 114 can be determined and/or adjusted to achieve a desirable vortical flow pattern within the contraction tube 72. In one embodiment, the contraction tube 72 can be an adjustable or variable vane geometry mixing apparatus coupled to a corresponding control system. The control system can be configured to command adjustment of the geometry of the vanes for different exhaust gas flow rates to optimize reductant distribution across the distribution across the face of the SCR catalyst and/or to optimize reductant mixing and decomposition.

The vortical or swirling pattern of exhaust within the contraction tube 72 effectively increases the distance the exhaust must travel relative to linear flow through a conventional exhaust tube having the same axial length of the contraction tube. Because the exhaust is forced to travel a longer distance, the residence time for decomposing the reductant into ammonia is increased. Accordingly, a contraction tube 72 having a certain axial length improves the decomposition of reductant to ammonia compared to a conventional linear tube having the same axial length. In addition to enhancing the decomposition of reductant to ammonia, the vortical pattern induced by the contraction tube 72 also improves the mixing of the reductant and/or ammonia with the exhaust gas. In certain implementations, reductant decomposition system 40, including the contraction tube 72, perforation tube 68, and decomposition chamber 44, decomposes and mixes urea with exhaust such that at the inlet of the SCR catalyst 36 the vapor uniformity index, which is representative of the molar number distribution of ammonia in the exhaust gas or molar flux through the SCR catalyst inlet, is greater than about 0.90, and the percent decomposition of urea to ammonia is greater than about 90%. Therefore, the reductant decomposition chamber 44 can be configured to achieve an ammonia mixing and decomposition index (i.e., vapor uniformity index multiplied by percent decomposition of urea to ammonia) of greater than about 0.80.

Figure 9:
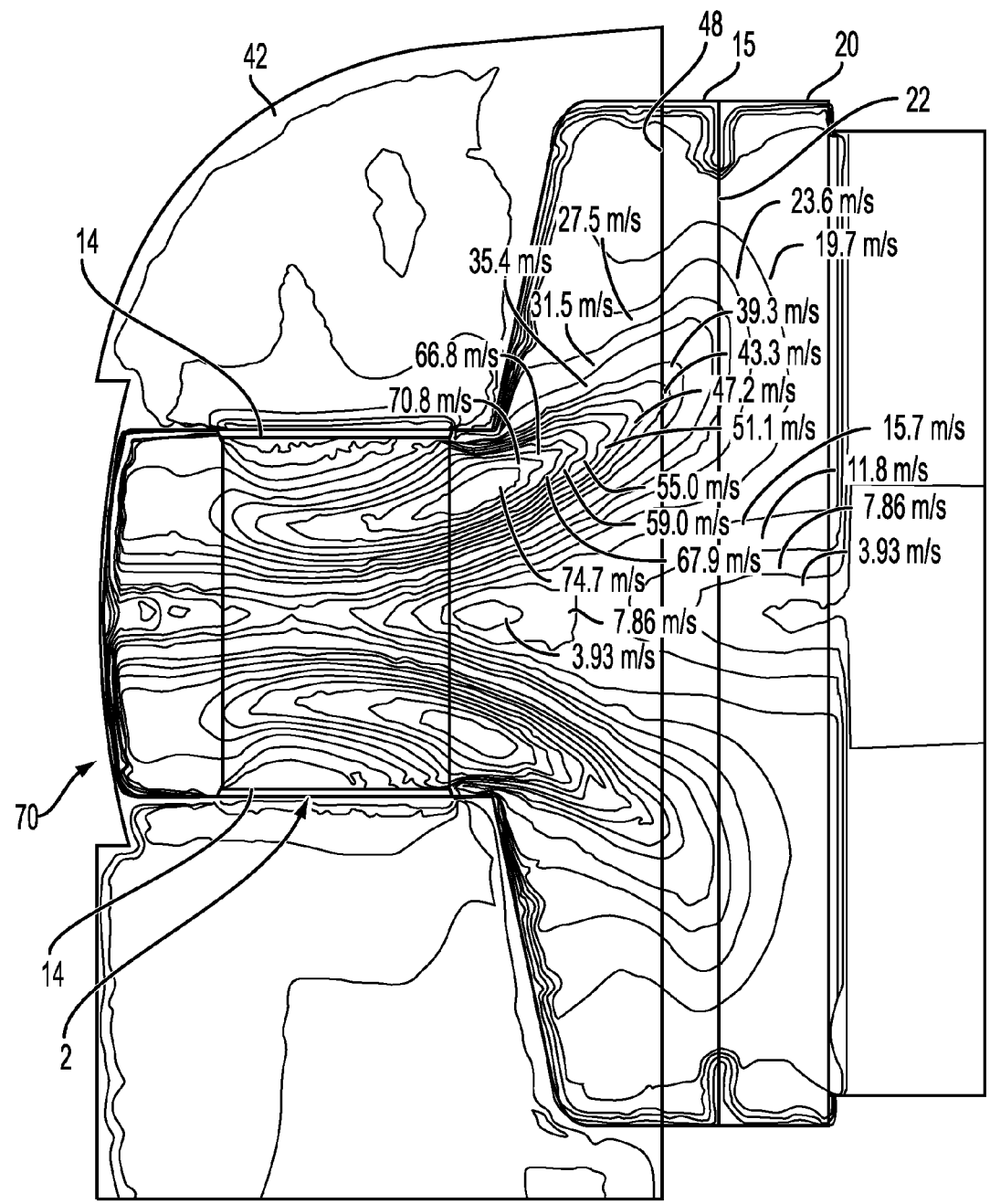
FIG. 9 is a cross-sectional side view of the exhaust distribution component of FIG. 6 showing a velocity contour plot of exhaust gas flow within the component according to a specific embodiment.

The contraction tube 72 also provides the added advantage of facilitating a more uniform exhaust flow distribution (i.e., higher flow distribution index) at the inlet face 37 of the SCR catalyst 36. As discussed above, the vanes 114 are configured to redirect exhaust flow outwardly toward the side 76 of the contraction tube 72 in a swirling pattern. Referring to FIG. 9, the side 76 of the contraction tube 72 retains the exhaust flow and redirects it toward the central axis of the tube. However, for exhaust flow entering the contraction tube 72 through the slots 112 at a location proximate the open end open end 77 of the tube, the side 76 does not retain the outwardly directed exhaust flow. Accordingly, as shown in FIG. 9, the exhaust flow continues to flow outwardly past the open end 77 of the contraction tube 72 and the space between the open end and the SCR catalyst inlet face 37. Conventional systems with linear tubing tend to result in a concentration of exhaust gas at an inner central location on the inlet face of the SCR catalyst. In contrast, the outwardly directed exhaust flow caused by the vanes 114 of the contraction tube 72 directs exhaust flow toward the outer portions of the inlet face 37 such that the exhaust gas is more uniformly distributed across the inlet face. In some implementations, a contraction tube 72 with a larger diameter results in more exhaust gas being distributed to the outer portions of the inlet face 37 of the SCR catalyst 36 and thus a higher exhaust flow distribution index at the inlet face.

After exiting the second exhaust distribution component 70, exhaust gas flows through the SCR catalyst 36 and ammonia oxidation catalyst 38 at 88 after passing through the outlet 48 of the decomposition chamber 44, second aperture 19, second housing inlet 32, and SCR catalyst inlet face 37. Exhaust gas then exits the second housing 30 through the outlet 24 at 90 after passing through the ammonia oxidation catalyst 38.

Figure 10:
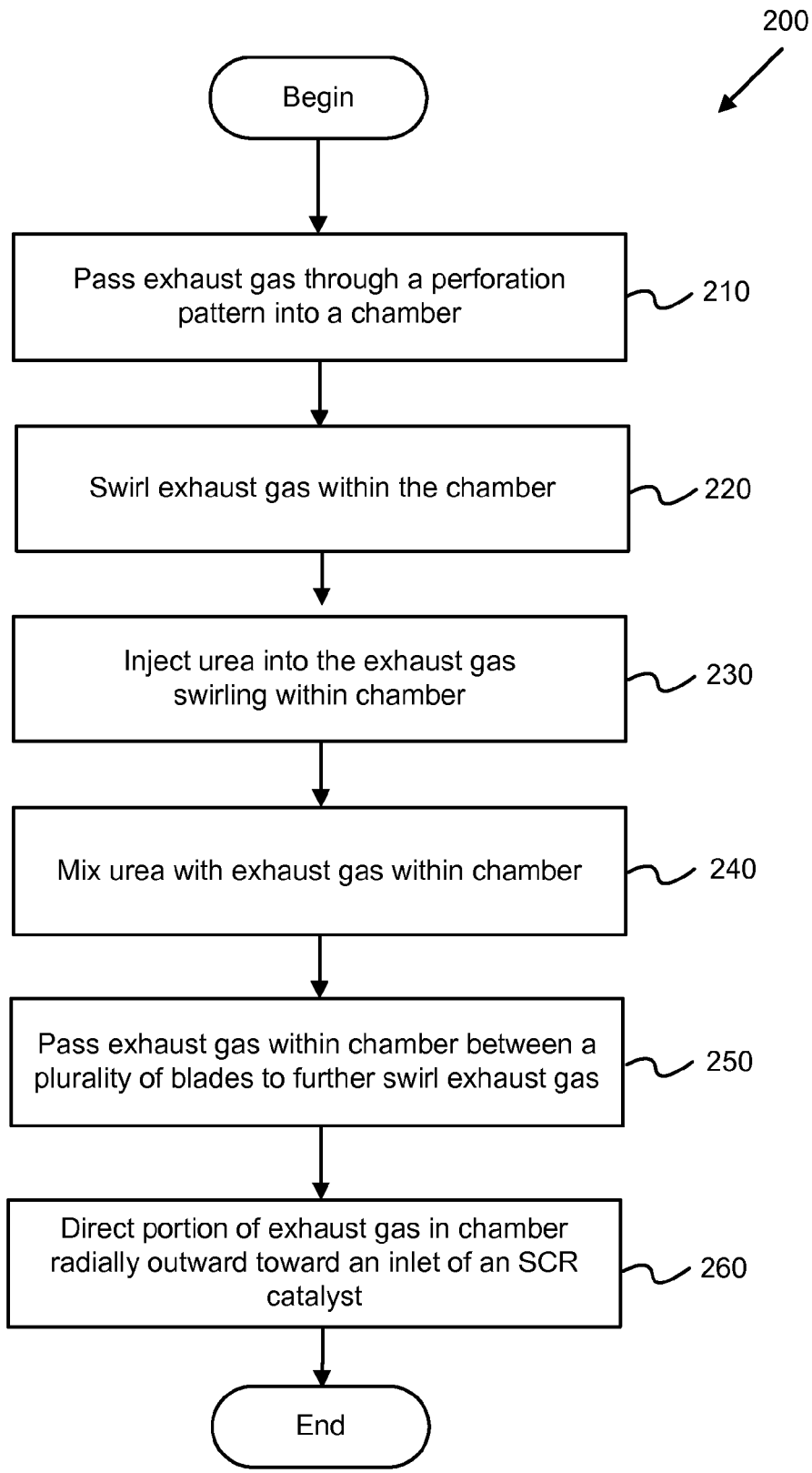
FIG. 10 is a method for decomposing urea into ammonia according to an embodiment.

According to one embodiment shown in FIG. 10, a method 200 for decomposing urea into ammonia includes passing exhaust gas through a perforation pattern and into a chamber at 210. The perforation pattern can be one or more perforation patterns, e.g., perforations patterns 100, 104, 108, that together cause exhaust gas to swirl 220 within the chamber, which increases the residence time of the system. The swirling flow of exhaust within the chamber can be the cumulative effect of a first faster flow (e.g., convective flow) created by a first perforation pattern of large perforations, a second faster flow (e.g., convective flow) created by the first perforation pattern, a first slower flow created by a second perforation pattern of smaller perforations, and a second slower flow created by a third perforation pattern. The perforation patterns can be formed in a perforation tube in exhaust receiving communication with an outlet of an exhaust aftertreatment component, such as a DPF. The method 200 also includes injecting a reductant, e.g., urea, into the exhaust gas swirling within the chamber at 230 and mixing the urea with the exhaust gas at 240. Further, the method includes passing exhaust gas from the chamber between a plurality of blades, e.g., blades 114, to further swirl the exhaust gas within the chamber at 250. Preferably, passing exhaust gas between the blades causes a vortical flow pattern, i.e., vortex. The blades can be part of a contraction tube in exhaust providing communication with an inlet of an exhaust aftertreatment component, such as an SCR catalyst. The method 200 can also include directing exhaust flow radially outward toward an SCR catalyst after passing through the plurality of blades at 260.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A reductant decomposition system, comprising:
an exhaust gas chamber comprising an inlet and outlet, the exhaust gas chamber having a non-cylindrical and non-linear shape;

a first exhaust gas distribution component positioned within the chamber and communicable in exhaust gas receiving communication with the inlet, the first exhaust gas distribution component being configured to cause swirling exhaust gas flow patterns within the exhaust gas chamber;

a second exhaust gas distribution component positioned within the chamber and communicable in exhaust gas providing communication with the outlet, the second exhaust gas distribution component being configured to cause a swirling exhaust gas flow pattern within the second exhaust gas distribution component; and a reductant injector coupled to the exhaust gas chamber, the reductant injector being communicable in reductant injecting communication with exhaust gas within the chamber.

2. The reductant decomposition system of claim 1, wherein the inlet and outlet of the exhaust gas chamber are substantially coplanar.

3. The reductant decomposition system of claim 1, wherein the exhaust gas chamber comprises a width and a length, the width being at least 0.25 times the length.

4. The reductant decomposition system of claim 1, wherein a reductant decomposition length of the exhaust aftertreatment system is longer than an axial length between the inlet and outlet of the exhaust gas chamber.

5. The reductant decomposition system of claim 1, wherein the first exhaust gas distribution component comprises a first set of small perforations and a second set of large perforations, and wherein the small perforations of the first set face toward the reductant injector and the large perforations of the second set face away from the reductant injector.

6. The reductant decomposition system of claim 5, wherein the first set of small perforations are configured to produce turbulent exhaust flow and second set of large perforations are configured to produce substantially convective exhaust flow.

7. The reductant decomposition system of claim 1, wherein the first exhaust gas distribution component comprises a perforation tube having a first open end, a second partially closed end, and a sidewall extending between the first open and second closed ends, and wherein the perforation tube comprises a plurality of perforations formed in the sidewall and partially closed end.

8. The reductant decomposition system of claim 7, wherein the plurality of perforations comprise a first set of perforations formed in the second partially closed end, a second set of perforations formed in a first portion of the sidewall, and a third set of perforations formed in a second portion of the sidewall, wherein the first set of perforations define a first percent open area, the second set of perforations define a second percent open area, and the third set of perforations define a third percent open area, and wherein the second percent open area is greater than the first percent open area and the third percent open area is greater than the second percent open area.

9. The reductant decomposition system of claim 1, wherein the second exhaust gas distribution component comprises a plurality of blades and corresponding slots configured to create an exhaust gas vortex within the second exhaust gas distribution component.

10. The reductant decomposition system of claim 9, wherein the second exhaust gas distribution component comprises a contraction tube having an open end, closed end, and a sidewall extending between the open and closed ends, wherein the plurality of blades and slots extend lengthwise along at least a portion of the sidewall.

11. The reductant decomposition system of claim 10, wherein each of the plurality of blades are angled with respect to the sidewall at a location proximate each blade, and wherein each blade extends outwardly from an outer surface of the sidewall and inwardly from an inner surface of the sidewall.

12. The reductant decomposition system of claim 11, wherein the angle formed between each of the plurality of blades and the sidewall at the location proximate each blade is based on a distance between the open end of the contraction tube and an exhaust gas aftertreatment device downstream of the open end of the contraction tube.

13. The reductant decomposition system of claim 1, wherein a height of the exhaust gas chamber proximate the first exhaust gas distribution component is greater than a height of the exhaust gas chamber proximate the second exhaust gas distribution component.

14. An exhaust gas aftertreatment system, comprising:
a diesel particulate filter through which exhaust gas flows in a first direction;
a selective catalytic reduction catalyst through which exhaust gas flows in a second direction substantially opposite the first direction;
a urea decomposition chamber comprising an inlet communicable in exhaust receiving communication with the diesel particulate filter and an outlet communicable in exhaust providing communication with the selective catalytic reduction catalyst, the urea decomposition chamber having a non-cylindrical and non-linear shape, and wherein the urea decomposition chamber facilitates swirling exhaust gas flow patterns within the urea decomposition chamber; and
a urea injector coupled to the urea decomposition chamber, the urea injector being communicable in urea injecting communication with exhaust gas in the urea decomposition chamber.

15. The exhaust gas aftertreatment system of claim 14, further comprising an exhaust distribution component positioned within the urea decomposition chamber and communicable in exhaust receiving communication with the inlet of the urea decomposition chamber, the exhaust distribution component comprising a first set of perforations each having a first area and a second set of perforations each having a second area, wherein the first area is substantially larger than the second area.

16. The exhaust gas aftertreatment system of claim 14, further comprising an exhaust distribution component positioned within the urea decomposition chamber and communicable in exhaust providing communication with the outlet of the urea decomposition chamber, the exhaust distribution component comprising a plurality of blades configured to swirl the exhaust within the exhaust distribution component.

17. The exhaust gas aftertreatment system of claim 14, wherein a shape of the urea decomposition chamber is defined by a height, length, and width, the length being greater than the width and height, and the width being greater than the height.

18. The exhaust gas aftertreatment system of claim 14, wherein a cross-sectional shape of the urea decomposition chamber along a plane extending perpendicular to the first and second exhaust flow directions comprises a first curved portion extending about the inlet and a second curved portion extending about the outlet, and wherein exhaust gas from the diesel particulate filter flows from the inlet to the outlet of the urea decomposition chamber.

19. The exhaust gas aftertreatment system of claim 18, wherein the first and second curved portions promote swirling of exhaust gas within the urea decomposition chamber.

20. A reductant decomposition system, comprising:
a reductant decomposition chamber comprising an exhaust gas inlet, and an exhaust gas outlet, the reductant decomposition chamber having a non-cylindrical and non-linear shape, and wherein the reductant decomposition chamber facilitates swirling exhaust gas flow patterns within the reductant decomposition chamber; and
a reductant injector coupled to the reductant decomposition chamber, the reductant injector being communicable in reductant injecting communication with exhaust gas in the reductant decomposition chamber.

21. The reductant decomposition system of claim 20, wherein exhaust gas flows through the exhaust gas inlet in a first direction and through the exhaust gas outlet in a second direction, and wherein the first direction is substantially opposite the second direction.

\* \* \* \* \*